US007577156B2

(12) United States Patent
Signaoff et al.

(10) Patent No.: US 7,577,156 B2
(45) Date of Patent: Aug. 18, 2009

(54) HIGHLY ADAPTABLE PROXY TRAVERSAL AND AUTHENTICATION

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: directPacket Research, Inc., Irving, TX (US)

( * ) Notice: Subject to any disclaimer, the term of this patent is extended or adjusted under 35 U.S.C. 154(b) by 357 days.

(21) Appl. No.: 11/404,045

(22) Filed: Apr. 13, 2006

(65) Prior Publication Data

US 2007/0242680 A1    Oct. 18, 2007

(51) Int. Cl.
*H04L 12/56* (2006.01)
(52) U.S. Cl. .................. 370/401; 370/466; 709/227
(58) Field of Classification Search .............. None
See application file for complete search history.

(56) References Cited

U.S. PATENT DOCUMENTS

| 6,795,444 | B1* | 9/2004 | Vo et al. .................. 370/401 |
| 7,363,381 | B2* | 4/2008 | Mussman et al. ........... 709/230 |
| 7,372,957 | B2* | 5/2008 | Strathmeyer et al. ... 379/265.01 |
| 2003/0182451 | A1* | 9/2003 | Grass et al. ................. 709/246 |
| 2005/0021610 | A1* | 1/2005 | Bozionek et al. ............ 709/203 |
| 2005/0125696 | A1* | 6/2005 | Afshar et al. ................ 713/201 |
| 2005/0271051 | A1* | 12/2005 | Holloway et al. ........... 370/389 |
| 2006/0109862 | A1* | 5/2006 | Choi et al. ................... 370/466 |

OTHER PUBLICATIONS

International Search Report and Written Opinion issued for PCT/US2007/066460; Dated: Apr. 9, 2008; 10 Pages.

* cited by examiner

*Primary Examiner*—Chi H Pham
*Assistant Examiner*—Soon-Dong D Hyun
(74) *Attorney, Agent, or Firm*—Fulbright & Jaworski, L.L.P.

(57) ABSTRACT

Systems and methods are disclosed for transporting multimedia protocol traffic over a proxy server using a commonly-used proxy protocol. Multimedia protocol traffic from a first endpoint is received and then converted. The converted data is then transmitted using a commonly-used protocol across a network. The traffic is received and reconverted to the original multimedia protocol. The reconverted data is then transmitted to a second endpoint. By using a commonly-used protocol to transmit traffic between endpoints, proxy servers between each endpoint may be traversed without changing any of their settings.

35 Claims, 1 Drawing Sheet

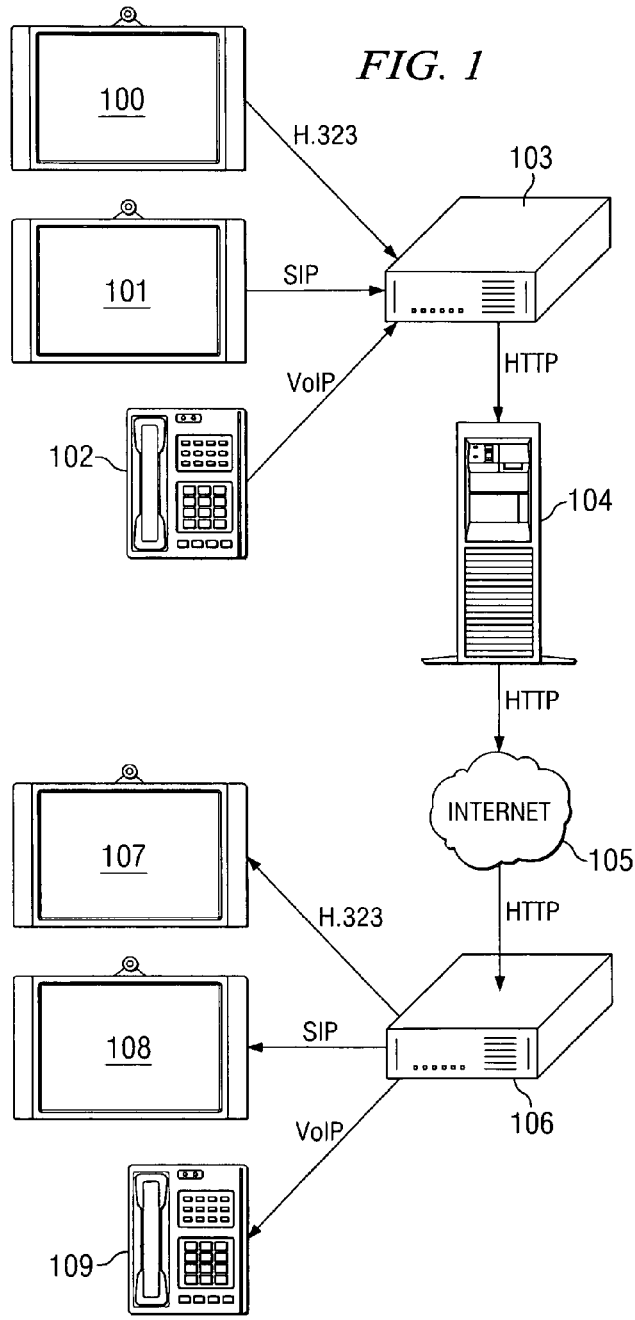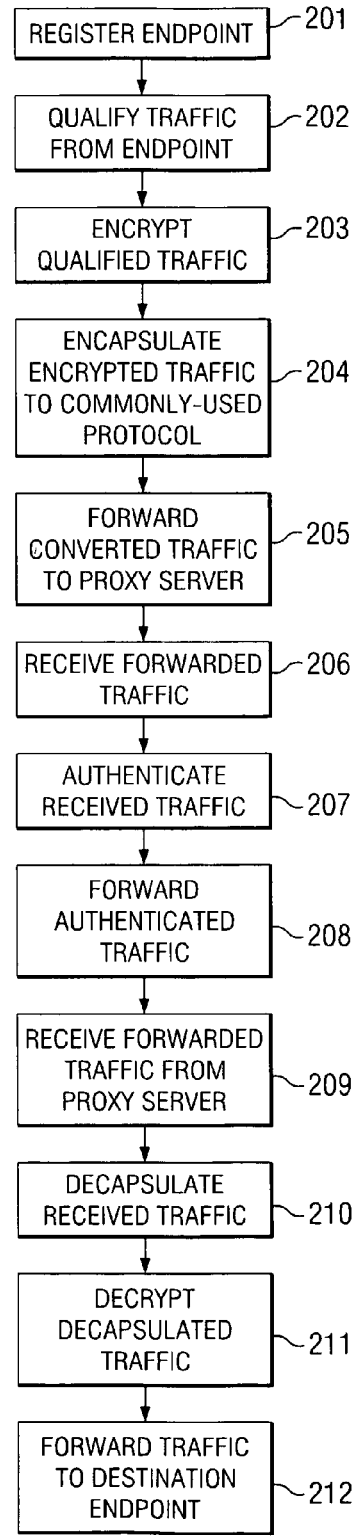

HIGHLY ADAPTABLE PROXY TRAVERSAL AND AUTHENTICATION

TECHNICAL FIELD

The present invention relates, in general, to electronic communications, and, more specifically, to transmitting communication data within a multimedia communication system.

BACKGROUND OF THE INVENTION

The Internet may be used for many forms of communication, including voice conversations, video conferencing, development collaboration, and the like. In order for a manufacturers' programs, applications, equipment, and systems to be interoperable with each other, many protocols have been developed to standardize the communication between such systems. These protocols have grown increasingly complex to handle all the types of traffic generated to facilitate communication for video conferencing, voice over Internet Protocol (VoIP), and data over Internet Protocol applications. Two such protocols are H.323 from the International Telecommunication Union—Telecommunication Standardization Sector (ITU-T) and the Session Initiation Protocol (SIP) from the Internet Engineering Task Force (IETF). Both H.323 and SIP, as well as Skype, Inter-Asterisk eXchange (IAX), and many other similar protocols, typically allow for multimedia communication including voice, video, and data communications in real-time.

H.323, SIP, VoIP, and the like are defined as application layer protocols of the Open Systems Interconnection (OSI) seven layer model. The layers of the OSI model include, from bottom to top, the physical, data link, network, transport, session, presentation, and application layers. Application layer protocols facilitate communication between software applications of devices providing a high level of abstraction from the details of sending information across a network, which are present at the lower layers of the OSI model. Examples of some commonly-used Application layer protocols include HyperText Transfer Protocol (HTTP), HTTP Secure (HTTPS), Simple Mail Transfer Protocol (SMTP), File Transfer Protocol (FTP), TELNET, Post Office Protocol version 3 (POP3), and Internet Message Access Protocol (IMAP).

In Internet Protocol (IP) communication networks, devices or endpoints on the network are usually identified by their respective IP address. Applications and programs on the different devices further identify each other using port numbers. A port number is a sixteen bit integer, the value of which falls into one of three ranges: the well-known ports, ranging from 0 through 1023; the registered ports, ranging from 1024 through 49151; and the dynamic and/or private ports, ranging from 49152 through 65535. The well-known ports are reserved for assignment by the Internet Corporation for Assigned Names and Numbers (ICANN) for use by applications that communicate using the Transmission Control Protocol (TCP) or User Datagram Protocol (UDP) and generally can only be used by a system/root process or by a program run by a privileged user. The registered ports may be registered for use by companies or other individuals for use by applications that communicate using TCP or UDP. The dynamic or private ports, by definition, cannot be officially registered nor are they assigned. Both the H.323 and SIP standards, as well as many other such communication protocols, use multiple, well-known, registered, and/or dynamic ports in order to facilitate such communication.

H.323 and SIP each rely on multiple other protocols, some of which may in turn rely on UDP for sending and receiving multimedia traffic. UDP features minimal overhead compared to other transport protocols (most notably TCP) at the expense of having less reliability. UDP does not provide for guaranteed packet delivery nor data integrity. However, UDP does offer the highest possible throughput, thus, making it ideally suited for multimedia real-time communications.

Multimedia communications traffic will most likely encounter a firewall at some point during transmission, especially over the Internet, without regard to which protocol the traffic conforms. Firewalls are used in modern networks to screen out unwanted or malicious traffic. One of many techniques a firewall may use is packet filtering, wherein the firewall determines whether or not to allow individual packets by analyzing information in the packet header (such as the IP address and port of the source and destination). Thus, various ports or IP addresses may be blocked to minimize the risk of allowing malicious traffic into an important computer network or system. Another more advanced technique is called stateful inspection, wherein in addition to analyzing header information, a firewall keeps track of the status of any connection opened by network devices behind the firewall. Deciding whether or not a packet is dropped in a stateful inspection is based on the tracked status of the connection and information from within the packet header. In practice, firewalls (especially those used by large corporations) generally only allow traffic from the well-known ports, though such firewalls may be specially configured to allow traffic on any port. For multimedia communication systems that use multiple registered and dynamic ports, firewalls (unless specially configured) will generally block the data traffic on these ports between multimedia systems, thus, preventing communication.

Video conferencing endpoints generally use multiple dynamic ports for the transmission of communication data packets and, as such, each port used necessitates opening that port on a firewall. Additionally, different endpoints participating in different conversations use different sets of ports, further increasing the number of ports to be opened on a firewall. Reconfiguring ports on a firewall is a time consuming task that introduces the risk of human error, which may defeat the purpose of the firewall by leaving a network vulnerable to malicious attacks. Furthermore, even though these dynamic ports should be closed after the communication ends, in practice, once a firewall port is open, it remains open because the firewall technicians typically do not expend the additional time resources to close the ports.

In addition to firewalls, most large networks also typically deploy proxy servers that are used for many reasons, including reducing the number IP addresses that a computer network exposes to external networks and/or the Internet and monitoring the traffic sent between internal and external networks. In order to connect to an external resource or the Internet, an internal computer of a network often times connects to a proxy server, the proxy server then connects to the external resource, and data sent between the internal computer and external resource is sent through the proxy. As such, the external resource is aware of only the proxy server's IP address and not the internal computer's IP address. Thus, by having the internal computer connect to the proxy server in lieu of directly connecting to the external resource, proxy servers may also be used to monitor and in some cases prevent the flow of traffic between internal computers and external resources. As an example, a computer attempting to connect to an unauthorized external resource (e.g., an illicit website, an external computer that is not secure, or the like) may be refused a connection by the proxy server or a connection may be terminated if the traffic between the internal computer and external resource contains unauthorized data or does not conform to an authorized protocol.

The proxy server may also be used to authenticate the communication from the endpoints with the internal network. If an unknown endpoint attempts to obtain access to the external network through the proxy server, the proxy server will prevent that access if the endpoint fails the authentication. Many different authentication protocols are typically used by various proxy servers. Examples of such authentication protocols are base64 encoding, Microsoft Corporation's NT LAN MANAGER™ (NTLM™), INTEGRATED WINDOWS AUTHENTICATION™ (IWA™), and the like.

Each Application layer protocol has its own specification for the proper exchange of messages that allow access to resources between network devices or endpoints. Network devices and endpoints conform to this specification to both properly interoperate with each other and to successfully traverse a proxy server. Protocol violations by network devices or endpoints may be treated by a proxy server as a security threat and thus, run the risk of a proxy server terminating a connection, thwarting communication between network devices. As an example, a proxy server may be monitoring a connection wherein a malicious website sends malformed HTTP traffic in an attempt to exploit a weakness of an internal computer. Upon finding such malformed HTTP traffic, the proxy server may terminate the connection to stop the attack on the internal computer.

Many proxy servers are HTTP proxy servers that provide Internet connections for computers within a network. Typically, proxy servers operate in a standard mode that may only allow traffic conforming to commonly-used protocols (e.g., HTTP, FTP, and the like). Multimedia protocols, such as H.323, SIP, VoIP, and the like, which are themselves not commonly-used protocols and also rely on other protocols that are not commonly-used may be blocked or simply ignored as incompatible data streams. As an example, in the case where an H.323 endpoint is behind an HTTP proxy server, the H.323 connection requests may be denied or ignored while another device's HTTP connection requests are allowed.

Existing video conferencing systems such as TANDBERG's BORDER CONTROLLER™, a component of TANDBERG's EXPRESSWAY™ firewall traversal solution, requires the use of TANDBERG Gatekeepers or TANDBERG traversal enabled endpoints. While allowing firewall traversal, the EXPRESSWAY™ solution still requires either proprietary proxy servers or standard proxy servers to be reconfigured to trust, allow, or even understand the protocols used. The V2IU™ series of products from Polycom, Inc., are Application Level Gateways (ALG) that act as protocol-aware firewalls that automate the selection and trusting of ports, but as such, require either standard proxy servers to be reconfigured to trust, allow, or understand the protocols used when sending traffic between endpoints or to bypass altogether the standard proxy servers of a network. Further, such an ALG does not provide for secure communication. The PATHFINDER™ series of products from RadVision, Ltd., provides for firewall traversal via multiplexing to a single port, but still requires standard proxy servers to be either bypassed or reconfigured to trust and allow the traffic sent between endpoints.

Similar systems have been implemented for voice, VoIP, and data over IP communication systems. Each either relies on a proprietary system or equipment or relies on standard proxy servers being reconfigured to trust, allow, or understand the traffic sent between endpoints, which could leave the underlying network vulnerable to malicious electronic attacks.

BRIEF SUMMARY OF THE INVENTION

The various representative embodiments of the present invention are directed to systems and methods for transporting multimedia protocol traffic using a commonly-used protocol that is known to be typically compatible with standard proxy servers. Multimedia protocol traffic from a first endpoint is received and then transmitted using a commonly-used protocol. The received commonly-used protocol traffic is then transmitted using the original multimedia protocol to a targeted second endpoint. In using the commonly-used protocol, the traffic may operate with a proxy server, such that little or no reconfiguration of the proxy server is required. In so doing, the risk of human error leaving a network vulnerable to malicious attacks is reduced. Moreover, instead of creating an unrecognizable data stream, which may still be rejected by more-advanced proxy servers, the various embodiments of the present invention actually creates a data stream that conforms to a known, commonly-used communication protocol.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a diagram illustrating example protocols used between devices on a network according to one embodiment of the present invention; and FIG. 2 is a flowchart illustrating example steps that may be employed by conversion devices to communicate with a proxy server in a communication system configured according to one embodiment of the present invention.

DETAILED DESCRIPTION OF THE INVENTION

A variety of protocols may be used to transmit multimedia traffic between endpoints of a network. Whether the traffic is data between applications, voice communications, or video conferencing, whenever multimedia traffic is used there is a possibility that the traffic or connection between devices will be refused by a proxy server between the devices. As an example, video conferencing systems, whether they are based on H.323, SIP, Skype, IAX, or other similar multimedia communication protocols, use multiple protocols and sub-protocols in order to enable two-way audio and video communication. The communication protocols specify different types of traffic that may be sent between endpoints which include media traffic (voice, video, and the like) along with the control traffic (camera, connection control, and the like). The media traffic comprises data for the images and sound being transmitted between endpoints with the control traffic comprising data used to control the connection between endpoints and the features of the endpoint (e.g., camera direction, zoom, and the like). When two video conferencing systems attempt to establish a connection, a proxy server may refuse to allow the connection as the devices may use unrecognized or unauthorized protocols.

FIG. 1 is a diagram illustrating example protocols used between devices on a network according to one embodiment of the present invention. Endpoints 100/101/102 each establish a separate connection with device 103, with each endpoint using its own respective multimedia protocol (100 using H.323, 101 using SIP, and 102 using VoIP). It is noted that while the endpoints of FIG. 1 are depicted as video conferencing systems (100/101/107/108) using either H.323 or SIP, and VoIP phones (102/109) using VoIP, any network equipment that communicates using a multimedia protocol, such as H.323, SIP, VoIP, Skype, IAX, or the like, may be used. Further examples of such equipment include H.323 gateways, SIP proxies, and the like.

Upon the creation of the connections with endpoints 100/101/102, device 103 establishes a connection with device 106 by first connecting to proxy server 104 using a commonly-used protocol, such as HTTP. It is noted that alternative embodiments may use other commonly-used protocols that are typically recognized and authorized by proxy servers including, but not limited to: HTTP, HTTPS, FTP, POP3, SMTP, IMAP, and the like. Further, while FIG. 1 illustrates device 103 using a single connection to proxy 104, alternative embodiments may use any number of connections between device 103 and proxy server 104. As an example, for each endpoint that connects to device 103, a separate connection may be established with proxy server 104, such that the traffic of each endpoint is transmitted using separate connections.

Proxy server 104 recognizes the protocol used by device 103 as a valid and authorized protocol and authenticates the communication from device 103 if necessary. Proxy server 104 may use any type of authentication protocol, such as NTLM™, IWA™, base65 encoding, or the like. Once proxy server 104 authenticates the communication, it establishes a connection with device 106 through Internet 105. In the case where HTTP is the protocol used, the connection between devices 103 and 106 may appear to proxy server 104 as a typical web browser attempting to connect to a website. Thus, proxy server 104, operating in a standard mode will facilitate and allow the connection to be made.

In alternative or additional embodiments of the invention the proxy server may require authentication from the device attempting to establish the connection. The information for this authentication may be from device 103 or be based on identification information from an endpoint connected to device 103. Such identification information may also incorporated into the data sent from the endpoints of a system.

Device 106 then establishes connections with endpoints 107/108/109 using the appropriate multimedia protocols (107 using H.323, 108 using SIP, and 109 using VoIP) completing the connections between endpoints 100/101/102 and 107/108/109, respectively. In alternative embodiments, device 106 may require device 103 to verify the connection attempt as an authorized request before establishing the connections with endpoints 107/108/109.

After all of the connections have been established, endpoints 100/101/102 may begin sending packets of multimedia data to device 103 using their respective protocols. Endpoints 100/101/102/107/108/109 are not aware of devices 103/106 nor proxy server 104 or how the connection was made, and may operate as if the connections were made directly.

Device 103 converts the protocol of the packets received from endpoints 100/101/102 to the protocol used to connect to proxy server 104 and then forwards the converted packets to proxy server 104. One method of converting is described in co-pending, commonly assigned, U.S. patent application Ser. No. _____ titled "SYSTEM AND METHOD FOR TRAVERSING A FIREWALL WITH MULTIMEDIA COMMUNICATION," the disclosure of which is incorporated by reference herein. Devices 103 and 106 follow the specification of the commonly-used protocol, and, as such, they generate messages and resource requests, such that the multimedia protocol data (including the messages and resource requests required by the multimedia protocol) will conform to the commonly-used protocol when passing through proxy server 104. Further, these messages and resource requests may be used to identify multimedia data being sent between devices 103/106 or to cause one of devices 103/106 to initiate further messages or resource requests. As an example when using HTTP, devices 103 and 106 may use specially formed resource requests that may identify any of the following: the type of multimedia protocol being used; the target endpoint; that a new endpoint is requesting a new connection; or the like.

Proxy server 104 recognizes the packets as valid, authorized, and properly requested packets conforming to a commonly-used protocol and forwards the packets to device 106. Proxy server 104 may maintain the status of all open connections and verify that the transfer of resources using those connections accords with the protocols used by the connections. As an example when HTTP is used, data may not be transferred unless requested, as such, devices 103 and 106 may continuously generate resource requests so that the multimedia data may be continuously transmitted across Internet 105.

Device 106 decapsulates the received packets, restoring the original multimedia protocol of the packets. In so doing, the packets may then be forwarded on to their target endpoint. Thus, each of endpoints 100, 101, and 102 has an established connection and may communicate with endpoints 107, 108, and 109 respectively through proxy 104 via network devices 103 and 106.

In alternative or additional embodiments, devices 103 and 106 may also qualify their incoming traffic in order to securely pass traffic associated with the connection between endpoints 100/101/102 and 107/108/109. One method of qualifying is described in co-pending, commonly assigned, U.S. patent application Ser. No. _____ titled "SYSTEM AND METHOD FOR TRAVERSING A FIREWALL WITH MULTIMEDIA COMMUNICATION."

FIG. 2 is a flowchart illustrating example steps 20 that may be employed by conversion devices, such as devices 103 and 106, to communicate with a proxy server in a communication system configured according to one embodiment of the present invention. An endpoint, when connected to a network, first registers with a conversion device by the endpoint identifying itself as a compliant endpoint (e.g., it is an endpoint that conforms to H.323, SIP, VoIP, or the like), as shown by step 201.

On a given network, multiple devices may be connected and as such, the conversion device receives traffic from many devices within that network. Thus, the conversion device qualifies the traffic it receives to ensure that the traffic sent to the destination conversion device is appropriate traffic. This is shown in step 202 and may be accomplished by comparing a given packet's source IP and port addresses to those of endpoints that have registered with the local conversion device. In step 203, the local conversion device encrypts the previously qualified traffic securing the communication between two endpoints using any suitable encryption method including, but not limited to: AES 128-bit, TDES, Skipjack, or the like. In step 204, the encrypted traffic is then encapsulated to conform to a commonly-used protocol, such as HTTPS, by placing the previously encrypted packet into a new packet conforming to HTTPS. As shown by step 205, the encapsulated traffic is then forwarded to the destination conversion device.

In step 206, the proxy server receives the forwarded traffic from the local conversion device. In step 207, the proxy server recognizes that the traffic conforms to a commonly-used protocol and authenticates the traffic for transmission to the destination conversion device. Step 208 has the proxy server forwarding the authorized traffic to the destination conversion device.

In step 209, the destination conversion device receives the commonly-used protocol traffic from the proxy server, which is decapsulated by step 210 restoring the original multimedia protocol of the packets. In step 211, this decapsulated traffic is then decrypted, thus, recovering the original multimedia and control communication information within the packets. With the packets being fully restored, they are then forwarded to the destination endpoint by the destination conversion device, as shown by step 212.

It is noted that while the disclosure has used the communication between video conference and VoIP phone endpoints as an example, it is understood that the systems and methods described may be used by other programs, applications, communications systems, and the like, that use multimedia protocols for communication. As such, embodiments of the invention may be used for audio systems VoIP systems, or any other system that uses a multimedia protocol to transfer data between devices. The same holds true for other types of programs, equipment, or applications using a multimedia protocol to transfer data across a network.

While each of the conversion devices, such as devices 103 and 106 (FIG. 1), is depicted connected to two video conferencing systems and a VoIP phone, they may be connected to a single or multiple and various video conference or phone systems, audio conference or phone systems, data collaboration systems, or the like. When multiple video, audio, or data collaboration systems are connected to a device, such as device 103, any connections or calls that do not require traversing a proxy server may, accordingly, not be transmitted across a network using a commonly-used communication protocol. As an example, if two video conference endpoints are on the same network behind a proxy server and are engaging in communications, this traffic may not pass through a proxy server (the traffic is only transmitted on the internal network). Thus, the conversion device may recognize this situation and, accordingly, not encapsulate nor encrypt the traffic between two such endpoints.

Additionally, a conversion device need not be a stand-alone device as its functionality may be integrated into any other network device including, but not limited to: video conference or phone systems, audio conference or phone systems, data collaboration systems, or the like. Alternative embodiments may also send traffic between endpoints 10 and 15 that conform to any number of standards or protocols for multimedia communication including, but not limited to the H.323, SIP, or VoIP protocols by converting the multimedia communication protocols into a commonly-used protocol that is typically allowed by most proxy servers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communication through a proxy server using a multimedia protocol, said method comprising:
   receiving a plurality of packets of data from a first endpoint in a multimedia protocol;
   converting said plurality of packets into a commonly-used protocol;
   establishing a connection with said proxy server using said commonly-used protocol;
   receiving at said proxy server said plurality of packets in said commonly-used protocol; and
   transmitting said plurality of packets to a second endpoint in said commonly-used protocol.

2. The method of claim 1, further comprising:
   receiving specially formed messages in said commonly-used protocol to control transmission of said plurality of packets.

3. The method of claim 1, further comprising:
   encrypting said data in said multimedia protocol prior to said converting.

4. The method of claim 3, wherein said encrypting is according to one of:
   an Advanced Encryption Standard (AES) 128-bit algorithm;
   a Triple Data Encryption Standard (TDES) algorithm; or
   a Skipjack algorithm.

5. The method of claim 1, wherein said multimedia protocol comprises one of: SIP, H.323, VoIP, Skype, and IAX.

6. The method of claim 1, wherein said commonly-used protocol comprises one of: HTTP. HTTPS, FTP, POP3, SMTP, and IMAP.

7. The method of claim 1, further comprising:
   qualifying said plurality of packets, wherein said qualifying comprises:
   registering an endpoint;
   determining whether said plurality of packets originated from said registered endpoint; and
   allowing further transmission of said plurality of packets based on said determining.

8. The method of claim 7 wherein said determining is implemented by use of an authentication protocol.

9. The method of claim 8 wherein said authentication protocol comprises one of:
   base64 encoding;
   NT LAN MANAGER™ (NTLM™); and
   INTEGRATED WINDOWS AUTHENTICATION™ (IWA™).

10. A system comprising:
   a first network device, comprising:
      an interface for receiving a plurality of packets in a multimedia protocol;
      a first conversion utility for converting said plurality of packets into a commonly-used proxy protocol;
      a second interface for transmitting said plurality of packets using said commonly-used proxy protocol; and
   a proxy server, comprising:
      a third interface for receiving said plurality of packets using said commonly-used proxy protocol;
      an authentication utility for authenticating said first network device; and
      a fourth interface for transmitting said plurality of packets using said commonly-used proxy protocol;
      wherein said authentication utility controls said transmitting on said fourth interface.

11. The system of claim 10, further comprising:
   a second network device comprising:
      a fifth interface for receiving said plurality of packets in said commonly-used proxy protocol;
      a second conversion utility for converting said plurality of packets from said commonly-used proxy protocol to said multimedia protocol;
      a sixth interface for distributing each of said plurality of packets using said multimedia protocol; and
   wherein said proxy server is traversed by using said commonly-used proxy protocol.

12. The system of claim 11, wherein said first and second network devices exchange specially formed commonly-used proxy protocol messages to control said transmission of said plurality of packets.

13. The system of claim 10, further comprising:
   an encryption application in said first network device for encrypting said plurality of packets.

14. The system of claim 13, further comprising:
   a decryption application in said second network device for decrypting said encrypted plurality of packets prior to said distributing.

15. The system of claim 13, wherein said encrypting is according to one of:
   an Advanced Encryption Standard (AES) 128-bit algorithm;
   a Triple Data Encryption Standard (TDES) algorithm; or
   a Skipjack algorithm.

16. The system of claim 10, wherein said multimedia protocol comprises one of: SIP, H.323, VoIP, Skype, and IAX.

17. The system of claim 10, wherein said commonly-used proxy protocol comprises on of: HTTP. HTTPS, FTP, POP3, SMTP, and IMAP.

18. The system of claim 10, wherein said authenticating is based on identification information in said plurality of packets.

19. The system of claim 10, wherein said authentication utility comprises one of:
   base64encoding:
   NT LAN MANAGER™ (NTLM™); and
   INTEGRATED WINDOWS AUTHENTICATION™ (IWA™).

20. A method comprising:
   receiving at a first network device a plurality of packets of data in multimedia protocol;
   converting said plurality of packets into a commonly-used protocol;
   establishing a connection with a proxy server using said commonly-used protocol;
   transmitting said plurality of packets to said proxy server in said commonly-used protocol;
   receiving at a second network device said plurality of packets in said commonly-used protocol; and
   converting said plurality of packets in said commonly-used protocol into said multimedia protocol.

21. The method of claim 20, further comprising:
   transmitting specially formed messages in said commonly-used protocol to control transmission of said plurality of packets from said proxy server.

22. The method of claim 20, further comprising:
   encrypting said plurality of packets prior to said converting said plurality of packets into a commonly-used protocol.

23. The method of claim 22 further comprising:
   decrypting said encrypted plurality of packets.

24. The method of claim 22, wherein said encrypting is according to one of:
   an Advanced Encryption Standard (AES) 128-bit algorithm;
   a Triple Data Encryption Standard (TDES) algorithm; or
   a Skipjack algorithm.

25. The method of claim 20, wherein said multimedia protocol comprises one of: SIP, H.323, VoIP, Skype, and IAX.

26. The method of claim 20, wherein said commonly-used protocol comprises one of: HTTP, HTTPS, FTP, POP3, SMTP, and IMAP.

27. The method of claim 20, further comprising:
   authenticating by said proxy server of said plurality of packets in said commonly-used protocol;
   transmitting, in said commonly-used protocol, from said proxy server said plurality of packets received from the first network device;
   wherein:
   said transmitting by said proxy server is controlled by said authenticating; and
   said authenticating is based on identification information within said plurality of packets.

28. The method of claim 27, wherein said authenticating is implemented using one or more of:
   base64 encoding;
   NT LAN MANAGER™ (NTLM™); and
   INTEGRATED WINDOWS AUTHENTICATION™ (IWA™).

29. A system comprising:
   a first network device, comprising:
      an interface for receiving a plurality of packets in a multimedia protocol;
      a first conversion utility for converting said plurality of packets into a commonly-used proxy protocol; and
      a second interface for transmitting said plurality of packets via a communication network using said commonly-used proxy protocol, wherein said commonly-used proxy protocol is a protocol that is commonly recognized by a receiving proxy server as a valid and authorized protocol.

30. The system of claim 29 wherein said transmitted plurality of packets is authenticable by said receiving proxy server.

31. The system of claim 29 further comprising:
   a second network device comprising:

a third interface for receiving said plurality of packets in said commonly-used proxy protocol;

a second conversion utility for converting said plurality of packets from said commonly-used proxy protocol to said multimedia protocol; and a fourth interface for distributing each of said plurality of packets using said multimedia protocol.

32. The system of claim 31 wherein said plurality of packets traverse said receiving proxy server by using said commonly-used proxy protocol.

33. The system of claim 32 wherein said plurality of packets are received at said third interface from said proxy server.

34. The system of claim 29 wherein said multimedia protocol comprises on of: SIP H.323, VoIP, Skype, and IAX.

35. The system of claim 29 wherein said commonly-used proxy protocol comprises one of: HTTP, HTTPS, FTP, POP3, SMTP, and IMAP.

* * * * *

UNITED STATES PATENT AND TRADEMARK OFFICE
CERTIFICATE OF CORRECTION

PATENT NO.       : 7,577,156 B2                                       Page 1 of 1
APPLICATION NO.  : 11/404045
DATED            : August 18, 2009
INVENTOR(S)      : Signaoff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this

Seventh Day of September, 2010

David J. Kappos
*Director of the United States Patent and Trademark Office*